(12) United States Patent
Adsule

(10) Patent No.: US 12,506,925 B2
(45) Date of Patent: Dec. 23, 2025

(54) SYSTEMS AND METHODS FOR MACHINE LEARNING-BASED CONTEXTUAL CUSTOMIZATION OF ON-DEMAND VIDEO STREAMING CONTENT

(71) Applicant: T-MOBILE INNOVATIONS LLC, Overland Park, KS (US)

(72) Inventor: Dharmendra Adsule, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/740,216

(22) Filed: Jun. 11, 2024

(65) Prior Publication Data
US 2025/0380025 A1 Dec. 11, 2025

(51) Int. Cl.
*H04N 21/431* (2011.01)
*H04N 21/234* (2011.01)

(52) U.S. Cl.
CPC ... *H04N 21/4318* (2013.01); *H04N 21/23418* (2013.01)

(58) Field of Classification Search
CPC .............. H04N 21/4318; H04N 21/23418
See application file for complete search history.

(56) References Cited

U.S. PATENT DOCUMENTS

| | | | | |
|---|---|---|---|---|
| 11,501,079 B1* | 11/2022 | Watson | .................. | G06N 3/088 |
| 2017/0186241 A1 | 6/2017 | Zavesky | | |
| 2020/0228880 A1 | 7/2020 | Iyer | | |
| 2024/0265204 A1* | 8/2024 | Meeks | .................. | G06F 40/279 |
| 2024/0323478 A1 | 9/2024 | Johnson | | |
| 2025/0111664 A1* | 4/2025 | Couleaud | .............. | G06V 20/30 |

OTHER PUBLICATIONS

Balaji et al., "Conditional GAN with Discriminative Filter Generation for Text-to-Video Synthesis", Proceedings of the Twenty-Eighth International Joint Conference on Artificial Intelligence (IJCAI-19), Aug. 2019, pp. 1995-2001.
Feuerriegel et al., "Generative AI", Business & Information Systems Engineering, vol. 66, No. 1, Feb. 2024, pp. 111-126.

(Continued)

*Primary Examiner* — Kyu Chae
(74) *Attorney, Agent, or Firm* — Shook, Hardy & Bacon L.L.P.

(57) ABSTRACT

Systems and methods for machine learning-based contextual customization of on-demand video streaming content are provided. A video context adaption engine may adjust one or more elements of video content data based on selected context profiles. A context profile may represent a set of characteristics that defines circumstances and/or features that form the setting for events, scenes, dialogue, actions, and other plot devices appearing in a work of video content. The video content data may be input as a prompt to a generative artificial intelligence (AI) machine learning model that outputs customized video content data that comprises an update or modification to one or more elements of content within the video content data based on the selected context profile(s). The customized video content data may then be served to a client application for presentation on user equipment.

20 Claims, 8 Drawing Sheets

(56) References Cited

OTHER PUBLICATIONS

Gill, J. K., "The Complete Guide to Generative AI Architecture", Available online at: <https://www.xenonstack.com/blog/generative-ai-architecture>, Nov. 21, 2023, 23 pages.
Girdhar et al., "EMU Video: Factorizing Text-to-Video Generation by Explicit Image Conditioning", Available online at: <https://arxiv.org/pdf/2311.10709>, Nov. 17, 2023, 29 pages.
Joubert et al., "Processing Scene Context: Fast Categorization and Object Interference", Vision Research, vol. 47, No. 26, Dec. 2007, pp. 3286-3297.
Mahmud et al., "Context Inference Engine (CiE): Inferring Context", International Journal of Advanced Pervasive and Ubiquitous Computing, vol. 4, No. 4, 2012, 18 pages.
OpenAI, "Creating Video from Text", Available online at: <https://openai.com/sora>, Retrieved on Mar. 1, 2024, 14 pages.
Ortiz, S., "Adobe's New Generative AI Tool is a Game-Changer for Video Editing", Available online at: <https://www.zdnet.com/article/adobes-new-generative-ai-tool-is-a-game-changer-for-video-editing/>, Oct. 13, 2023, 9 pages.
Rask AI, "Leading Ai Video Localization & Dubbing Tool", Available online at: <https://www.rask.ai/>, Retrieved on Mar. 1, 2024, 7 pages.
Sakirin et al., "A Survey of Generative Artificial Intelligence Techniques", Babylonian Journal of Artificial Intelligence, vol. (2023), Mar. 10, 2023, pp. 10-14.
Sheynin et al., "Emu Edit: Precise Image Editing via Recognition and Generation Tasks", Available online at: <https://arxiv.org/pdf/2311.10089>, Nov. 16, 2023, 23 pages.

\* cited by examiner

SYSTEMS AND METHODS FOR MACHINE LEARNING-BASED CONTEXTUAL CUSTOMIZATION OF ON-DEMAND VIDEO STREAMING CONTENT

CROSS-REFERENCE TO RELATED APPLICATIONS

This Application is related to U.S. patent application Ser. No. 18/740,211, titled "MACHINE LEARNING-BASED CUSTOMIZATION FOR VIDEO STREAM CONTENT DELIVERY SYSTEMS AND APPLICATIONS", filed on Jun. 11, 2024, which is incorporated by reference in its entirety.

BACKGROUND

Video stream content delivery systems are typically cloud-based platforms that deliver on-demand video content to users over the internet. The platforms may be implemented, for example, by a network of strategically located and geographically distributed content servers and may leverage infrastructures provided by internet service providers and data center operators to stream content between content servers and the users requesting the content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure, among other things, provide for a machine learning/generative artificial intelligence (GAI)-based video context adaption engine that may be used to adjust one or more elements of video content (e.g., stream video content) based on one or more selected context profiles. As discussed herein, a context profile may represent a set of characteristics that defines circumstances and/or features that form the setting for events, scenes, dialogue, actions, and other plot devices appearing in a work of video content. Those context profiles may be based on, for example, characteristics and/or features of different time periods, different cultural and/or social norms and/or historical events, and may describe features of, for example, styles, objects, scenery, architecture, technology, location, characters, actors, languages, dialects, music, and cultural references associated with a particular context. In some embodiments, streaming video content served by a content server may be input as prompts to a generative artificial intelligence (AI) machine learning model that outputs customized video content data that comprises an update or modification to one or more elements of video content based on the selected context profile(s). The updated video content data may then be served to a client application for presentation on user equipment.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
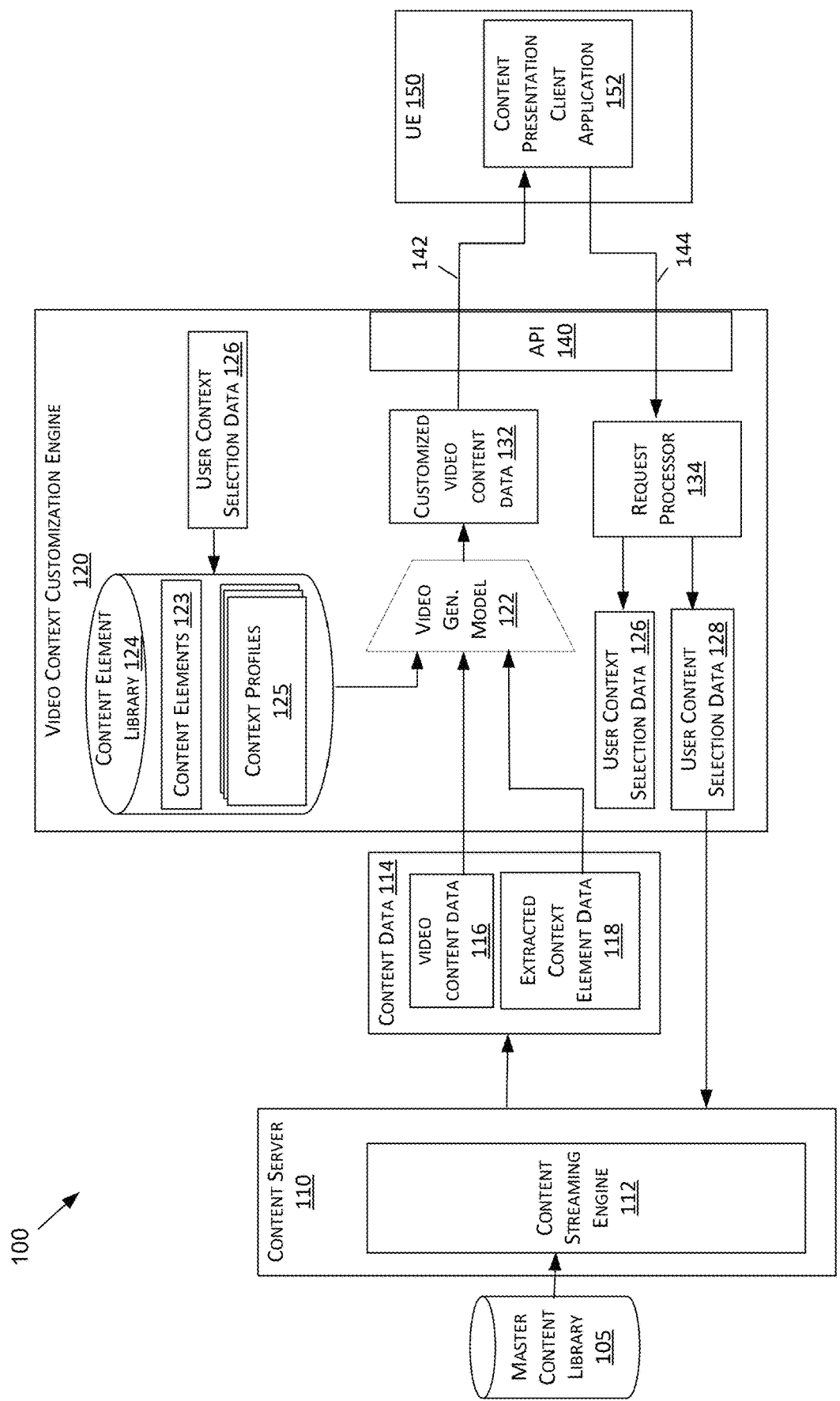
FIG. 1 is a diagram illustrating an example machine learning-based customized video stream content delivery system, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

With present video stream content delivery technologies, when a user decides to watch streaming content on their device (user equipment (UE) such as a smartphone, tablet, computer, or smart television, for example), they launch a streaming application and request the streaming content they wish to watch. The streaming application sends a request for the streaming content, which is routed to a content server. The content may be retrieved from a storage system, encoded into a streaming format, and transmitted over the network (e.g., the Internet) to the streaming application for presentation on the user's device. The content presented on the UE is expected to be a faithful reproduction of the content as it was retrieved from the storage system.

However, sounds and images of video content (such as but not limited to motion pictures, television episodes, cartoon shorts, etc.) are often a reflection of the time period and/or circumstances under which they were produced—or may otherwise reflect the sensibilities of that time that are no longer relevant or relatable to contemporary video content consumers, or that may even be offensive or otherwise emotionally upsetting. For example, words or language used in past decades may now be considered inappropriate slurs, or other aspects of the context in which a story is told may be considered stale, aged, old-fashioned, or otherwise unappealing to the degree that contemporary video content consumers will not select the content for viewing. Such instances lead to sub-optimal network resource utilizations, as the resources used to store and serve the video content are not being efficiently used to their potential because of diminished user engagement caused by elements in the content deemed undesirable to the user.

In contrast with such presently available video stream content delivery technologies, embodiments of the present disclosure, among other things, provide for a machine learning/generative artificial intelligence (GAI)-based video context adaption engine that may be used to adjust one or more elements of video streaming content based on one or more selected context profiles. As discussed herein, a context profile may represent a set of characteristics that defines circumstances and/or features that form the setting for events, scenes, dialogue, actions, and other plot devices appearing in a work of video content. Those context profile may be based on, for example, characteristics and/or features of different time periods, different cultural and/or social norms and/or historical events, and may describe features of, for example, styles, objects, scenery, architecture, technology, location, characters, actors, languages, dialects, music, cultural references, associated with a particular context. In some embodiments, the video context adaption engine evaluates adjustable context element data derived from video streaming content to identify features of video streaming content that may be adjusted to conform to a user-selected context profile—and generate in real-time a customized version of the content adjusted to the user-selected context profile—without having to modify the master (original) instance of the video content as stored by the video stream content delivery platform serving the content. For example, using a client application on their device, a user may select the 1948 motion picture Key Largo starring Humphrey Bogart, Edward G. Robinson, and Lauren Bacall, and further select (e.g., via a context preference input) a current time period-based context profile to bring the scenery, language, dialogue, and other features of the original video content into a $21^{st}$ century context. In some embodiments, the video context adaption engine identifies elements of the original video content that may be modified to conform to the selected $21^{st}$ century context profile, and apply generative artificial intelligence (GAI) to generate customized video content data that may be streamed back to the client application for presentation to the user. A context profile may provide for contextual layering that lets a user select different subsets of elements to adjust, or to keep as presented in the original content. For example, the context profile may provide the ability for the user to select to retain Humphrey Bogart, Edward G. Robinson, and/or Lauren Bacall in the customized video content, or replace one or more of those actors (e.g., with contemporary actors).

In some embodiments, when a request is made using a client application executing on a user's UE, the request may include user content selection data and user context selection data. The request may be received and processed by the video context adaption engine (e.g., via an application programming interface) where the user content selection data is used to initiate streaming of a selected title of video content (e.g., a selected movie, television episode, or other content) from the content server, and the user context selection data is used to select a context profile that will be used to modify selected elements of the streaming video content prior to display by the streaming application on the UE. In some embodiments, the streaming video content served by the content server and the selected context profile may be input as prompts to a generative artificial intelligence (AI) machine learning model that outputs video content data that comprises an update or modification to one or more elements of content within the streaming video content based on the user context selection data. The updated video content data may then be served to the client application for presentation on the UE.

For example, user context selection data may include a request that may specify requested modifications to the streaming video content to replace, redact, or otherwise alter one or more elements of the streaming video content as indicated by the selected context profile. For example, the user context selection data may specify, for example, that American cultural references reflected in the original video content is to be replaced with corresponding, or similar, Indian cultural references. The video context adaption engine may comprise a library of content elements that are correlated to a plurality of different context profile sets, one or more of which may be selected based on the user context selection data and applied to update the streaming video content based on the user's contextual preferences. For example, actors, background music, background settings, songs sung by characters, cultural references, languages, dialogues, behavioral mannerisms, dialects, phrases, animals, inanimate objects, and/or types of technology that appear in scenes, and/or other context-defining features, are non-limiting examples of contextual elements that may be updated by the video context adaption engine by applying one or more context profiles in response to the user context selection data. Moreover, content elements that may be considered taboo may be defined by a context profile, and the video context adaption engine using such a context profile may generate customized video content that redacts those content elements. As such, a user may select a context profile to define a set of features that they desire to be updated to a new context, without having to individually select specific elements to be updated. Selecting a context profile automatically selects a range of features that are to be adjusted in a consistent manner.

FIG. 1 is a diagram illustrating a data flow diagram for an example machine learning-based customized video stream content delivery system 100 in accordance with embodiments of this disclosure. In FIG. 1, a user may operate user equipment 150 to execute a content presentation client application 152 for selecting and viewing video content from a content server 110. UE 150 may include computing devices such as, but not limited to, handheld personal computing devices, cellular phones, smart phones, tablets, laptops, smart televisions, content streaming devices, and similar consumer equipment, or stationary desktop computing devices, workstations, servers, and/or network infrastructure equipment. As such, the UE 150 may include both mobile UE and stationary UE. A UE 150 can include one or more processors and one or more non-transient computer-readable media for executing code to carry out the functions of the UE 150 described herein. In some embodiments, the UE 150 may be implemented using a computing device 700, as discussed below with respect to FIG. 7. One or more applications may be executed by processors of the UE 150, such as content presentation client application 152. In some embodiments, the content presentation client application 152 may comprise a general-purpose web browser. In some embodiments, the content presentation client application 152 may comprise a client application specifically for receiving streaming video streaming content from a content server 110.

As shown in FIG. 1, in this example, the content presentation client application 152 may interface with the content server via a video context customization engine 120. In some embodiments, the video context customization engine 120 may be implemented at least in part using a computing device 700, as discussed below with respect to FIG. 7. In some embodiments, the video context customization engine 120 may be implemented at least in part using a cloud computing environment 810, as discussed below with respect to FIG. 8. The function of the video context customization engine 120 described herein may be performed by one or more processors that execute computer-usable instructions stored on one or more computer-readable media.

In some embodiments, the content presentation client application 152 may send a content request 144 (e.g., based on user inputs) to an application programming interface (API) 140 of the video context customization engine 120. The content request 144 may be received by a request processor 134 that extracts from the content request 144 a user content selection data 128 and user context selection data 126. The user context selection data 126 may indicate context selections that correlate (e.g., match) with one or more of the one or more context profiles 125. For example, a context selection that indicates 19$^{th}$ century China may correlate with a context profile comprising content elements based on various characteristic and/or features of 19$^{th}$ century China. In some embodiments, request processor 134 may comprise a natural language processor (NLP)—such as a large language model (LLM)-based machine learning model—that demines the user content selection data 128 and/or user context selection data 126 based on a natural language input received from the user. For example, the request processor 134 may predict or infer a selection of one or more context profiles 125 from the content element library 124 based on the content request 144, and output user context selection data 126 that includes an indication of the selection.

The video context customization engine 120 may communicate the user content selection data 128 to a content streaming engine 112 of the content server 110 to retrieve content data 114 from a master content library 105 (e.g., a data store comprising a library of streaming video content) based on the user content selection data 128. The content data 114 may then be transmitted (e.g., in video streaming format for streaming over a network) by the content streaming engine 112 to the video context customization engine 120, which may then generate and deliver customized video content data 132 back to the UE 150 for presentation by the content presentation client application 152.

As shown in FIG. 1, in some embodiments, the content data 114 received by the video context customization engine 120 may comprise at least video content data 116 and may include extracted context element data 118 that was derived from the video content data 116. That is, the video content data 116 may include a master, or baseline, version of the video content selected by the user (e.g., as indicated by the user content selection data 128) as read from the master content library 105. It should be understood that video content data 116 may include a combination of a video channel with video data and one or more corresponding tracks of audio in audio channels. For example, the video content data 116 may comprise a version of a motion picture or television episode as provided by the studio or distribution company for distribution via streaming services.

The extracted context element data 118 may comprise one or more feature characteristics of elements of the video content data 116 that are detected and/or extracted from the video content data 116, for example by a machine learning model, as discussed below with respect to FIG. 2. Extracted context element data 118 may include element data that represents individual features of the video content data 116 such as, but not limited to, the identification and/or classification of objects, actors, characters, character behaviors, scenery elements, spoken and/or sung content, character voice characteristics, languages, dialects, music, background settings, background sounds, cultural references, phrases, animals, inanimate objects, types of technology, and/or other elements of scenes depicted by the video content data 116. Moreover, extracted context element data 118 may include more intangible elements, such as (but not limited to) the identification and/or classification of plot elements, actions taken by characters and/or the mood of a scene, for example. Each of the features represented by element data in the extracted context element data 118 represents elements of the video content data 116 that may be replaced, redacted, or otherwise altered, by the video context customization engine 120 based on the user context selection data 126.

In some embodiments, the video context customization engine 120 may comprise a video generating model 122, such as, for example a generative artificial intelligence (GAI)-based machine learning model implemented using a deep neural network (DNN), Generative Adversarial Networks (GANs), variational autoencoder (VAE), and/or other GAI machine learning model architecture. In some embodiments, the video generating model 122 may be trained on annotated video to generate temporally coherent frames of photorealistic video. In some embodiments, the video generating model 122 may be trained using video content (which may include video and audio data channels), and/or segments thereof, annotated with contextual indicators that may correspond to one or more of the context profiles (e.g., to train the video generating model 122 on features and content elements that characterize a particular context). In some embodiments, extracted context element data 118, context profile sets 125, and/or content elements 123 may be input to the video generating model 122 as prompts that are used by the video generating model 122 as support data to more efficiently identify elements of the video content data 116 to be adjusted, replaced, redacted, or otherwise altered to update the context of the video content data 116 to conform to one or more selected context profiles indicated by the user context selection data 126.

The video context customization engine 120 may further comprise a content element library 124 coupled to the video generating model 122. The content element library 124 may comprise a data store or other data structure that defines feature data that may be used to modify one or more of the features represented by element data from the extracted context element data 118, based on the user context selection data 126. As shown in FIG. 1, the content element library 124 may comprise a plurality of content elements 123. The plurality of content elements 123 may be correlated to a plurality of different context profile sets 125, one or more of which may be selected based on the user context selection data 126 and applied by the video generating model 122 to update the streaming video content based on the user's contextual preferences.

As shown in FIG. 1, each of the content element library 124 (e.g., content elements 123 for the one or more selected context profiles 125), the video content data 116, and the extracted context element data 118 may provide inputs and/or prompts used by the video generating model 122 to generate customized video content data 132 (which represent an updated version of the video content data 116). In some embodiments, the user context selection data 126 may be provided as an input and/or prompt. In some embodiments, the video generating model 122 may use the selected context profiles 125 to infer/predict which elements of the extracted context element data 118 are to be modified (e.g., target features of the video content data 116) to implement the user's context customization preferences to produce the customized video content data 132. In some embodiments, the video generating model 122 may use one or more similarity algorithms to match element data corresponding to target features, with similar elements from the selected context profiles 125 (e.g., within a similarity threshold) to generate customized video content data 132—where the identified target features are modified based at least in part on the similar elements identified from the content elements 123 of the content element library 124. For example, if a selected context profile 125 indicates that a target feature "A" (e.g., the style of clothing worn by a character) should be replaced with feature "B" (e.g., a style of clothing represented by a selected context profile 125), then the video generating model 122 may infer a modification to be generated to target feature "A" based on one or more of the characteristics of feature "B." This same process may be applied for each of the target features inferred from the selected context profiles 125 to modify the video content data 116 and produce customized video content data 132. The customized video content data 132 may then be streamed to the content presentation client application 152. More specifically, the video context customization engine 120 may generate a streaming output 142 from the API 140 that includes the customized video content data 132. The content presentation client application 152 receives the streaming output 142 and produces a rendering of the customized video content data 132 on a display of the UE 150. It should be understood that the customized video content data 132 may include a combination of a video channel with video data and one or more corresponding tracks of audio in audio channels. The customized video content data 132 may be transmitted by the real-time streaming output 142 in a format for streaming video, which may be encoded in a format such as, but not limited to, High-Efficiency Video Coding (HEVC, H.265), Advanced Video Coding (H.264), AOMedia Video 1 (AV1), a Moving Picture Experts Group (MPEG) codec, or other format, protocol and/or codec.

Figure 2:
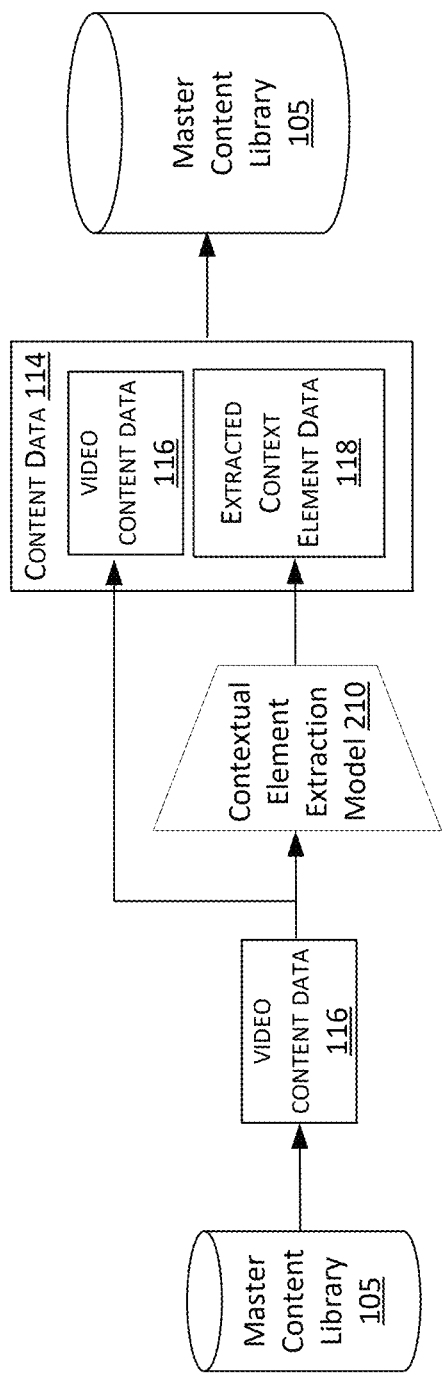
FIG. 2 is a diagram illustrating an example of generating extracted context element data from video content data, in accordance with some embodiments described herein.

Referring now to FIG. 2, FIG. 2 illustrates a process for generating extracted context element data 118 from video content data 116 to produce a set of content data 114 for processing by the video context customization engine 120, as described herein. In some embodiments, the video content data 116 may be input to a context element extraction model 210. The context element extraction model 210 comprises, for example, a machine learning model that is trained to identify and extract features from video content data 116 as described above, and output the extracted context element data 118 associated with that video content data 116. As discussed above, extracted context element data 118 may include element data that represents individual features of the video content data 116 such as, but not limited to, the identification and/or classification of objects, actors, characters, character behaviors, scenery elements, spoken and/or sung content, character voice characteristics, languages, dialects, music, background settings, background sounds, cultural references, phrases, animals, inanimate objects, types of technology, and/or other elements of scenes depicted by the video content data 116. Moreover, extracted context element data 118 may include more intangible elements, such as (but not limited to) the identification and/or classification of plot elements, actions taken by characters and/or the mood of a scene, for example. In some embodiments, the context element extraction model 210 may generate, for example, extracted context element data 118 in the form of a vector or other data structure characterizing an extracted feature, or other encoded format, such as a tokenization of features from the video content data 116. In some embodiments, feature data (e.g., content elements 123) provided by the content element library 124 may have a corresponding form and/or encoding format to facilitate matching target elements with library feature data, as discussed above. For example, tokenization is a way of generating a representation of a set of data (e.g., data representing a feature or element from video content data 116) by replacing the data with tokens that act as surrogates for the actual information. Content elements 123 provided by the content element library 124 may be similarly tokenized in a manner that permits matching by a similarity algorithm based on the user context selection data 128. The extracted context element data 118 produced by the context element extraction model 210 may be combined with the video content data 116 to define content data 114 for an item of video content. The content data 114 may be stored to the master content library 105, from which it can be requested (e.g., based on a user context selection data 128) as streaming content for downstream processing by a video context customization engine 120, as discussed with respect to FIG. 1.

Figure 3:
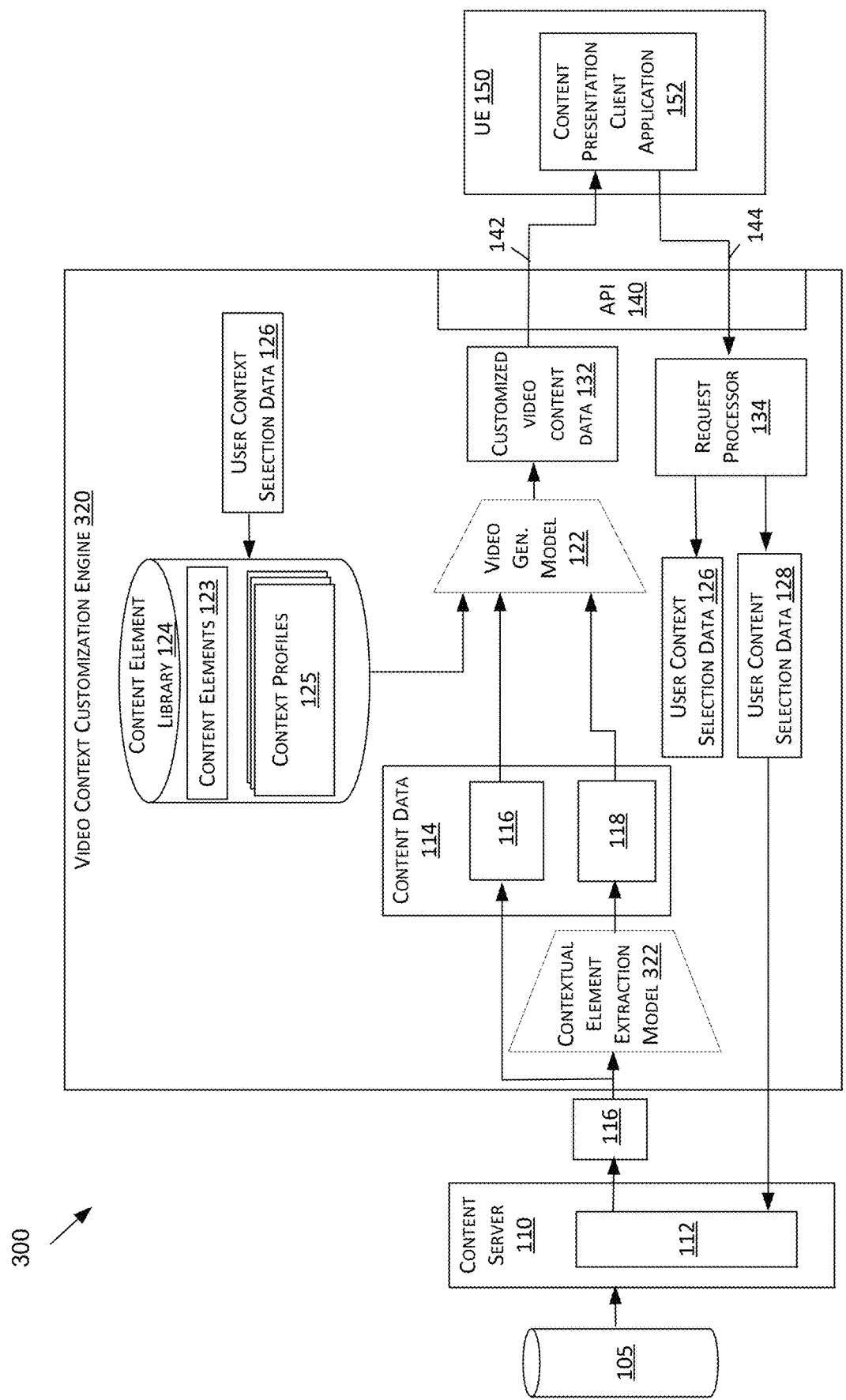
FIG. 3 is a diagram illustrating an example machine learning-based customized video stream content delivery system, in accordance with some embodiments described herein.

Referring now to FIG. 3, FIG. 3 at 300 illustrates an example of an alternative configuration of machine learning-based customized video stream content delivery system 100 wherein, in some embodiments, the extracted context element data 118 may be generated directly by a video context customization engine using the video content data 116 streamed to the video context customization engine from a content server 110. For example, FIG. 3 illustrates a video context customization engine 320 that operates and functions as discussed above with respect to the video context customization engine 120, and further includes an integrated context element extraction model 322 that functions as described with respect to the context element extraction model 210 of FIG. 2.

In operation, the content presentation client application 152 may send a content request 144 (e.g., based on user inputs) to an application programming interface (API) 140 of the video context customization engine 320. The content request 144 may be received by a request processor 134 that extracts from the content request 144 a user content selection data 128 and user context selection data 126. The video context customization engine 320 may communicate the user content selection data 128 to the content streaming engine 112 of the content server 110, which in response to the user content selection data 128 begins transmission (e.g., streaming transmission) of the video content data 116 to the video context customization engine 320. The video content data 116 may be input to the context element extraction model 322, which comprises a machine learning model that is trained to identify and extract features from video content data 116 as described above, and output the extracted context element data 118 associated with that video content data 116. The extracted context element data 118 and associated video content data 116 may define content data 114 as described herein, which are input to video generating model 122. Each of the content element library 124, the video content data 116, the extracted context element data 118, and the user context selection data 126 may provide inputs and/or prompts used by the video generating model 122 to generate the customized video content data 132 and streaming output 142 from the API 140 that includes the customized video content data 132.

Figure 4:
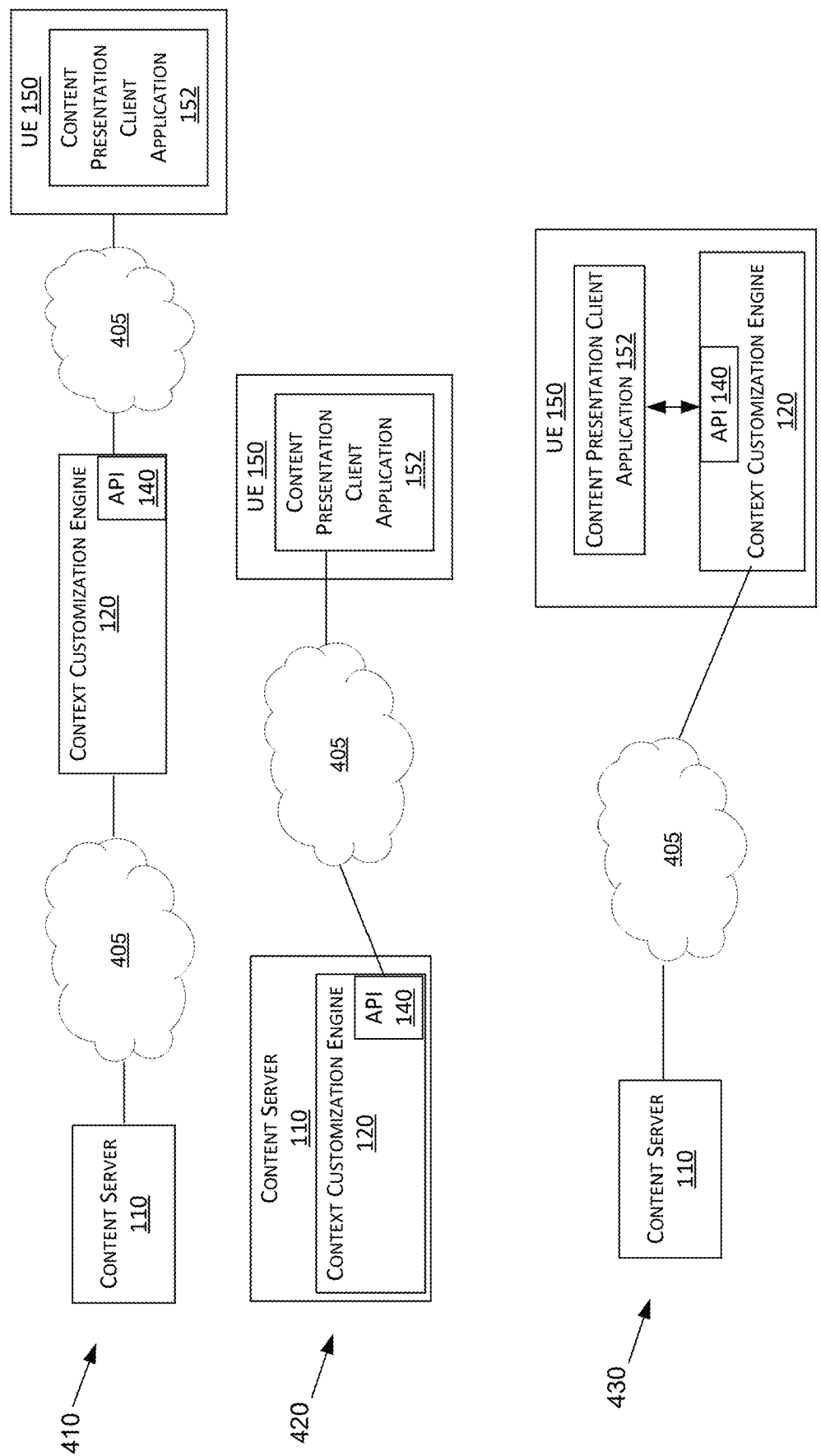
FIG. 4 is a diagram illustrating an example configuration for video context customization engine in a network environment, in accordance with some embodiments described herein.

FIG. 4 is a diagram illustrating example configurations for video context customization engine in a network environment. In various embodiments, the content server 110, video context customization engine 120, and UE 150 may be arranged in various network connection configurations, as shown in FIG. 4. For example, in some embodiments, as shown at 410, the content server 110, video context customization engine 120, and UE 150 may each be implemented on distinct elements communicatively coupled together by a network connection via one or more networks 405 (e.g., a local area network, wide area network, a wired or wireless telecommunications network, and/or the Internet). That is, the video context customization engine 120 comprises a networked element that is positioned between the content server 110 and the UE 150 (with respect to data flow) through the one or more networks 405. The content presentation client application 152 communicates with the video context customization engine 120 over one or more networks 405, and the video context customization engine 120 communicates with the content server 110 over one or more networks 405. In some embodiments, such as shown at 420, the video context customization engine 120 may be implemented as an integrated service of the content server 110. That is, the content presentation client application 152 communicates a content request 144 (via network(s) 405) directly with the content server 110, which comprises the video context customization engine 120 to generate the customized video content data 132 and server it back to the content presentation client application 152 (via network(s) 405). In some embodiments, such as shown at 430, the video context customization engine 120 may be an integrated function executed onboard the UE 150. In this configuration, the content presentation client application 152 communicates a content request 144 to the video context customization engine 120 through an internal data channel of the UE 150, and the video context customization engine 120 within the UE 150 communicates with the content server 110, as discussed above. In still other embodiments, one or more of the functions of a video context customization engine may be distributed for implementation between various networked elements such as a content server, a middleware network server node, and/or a UE.

Figure 5:
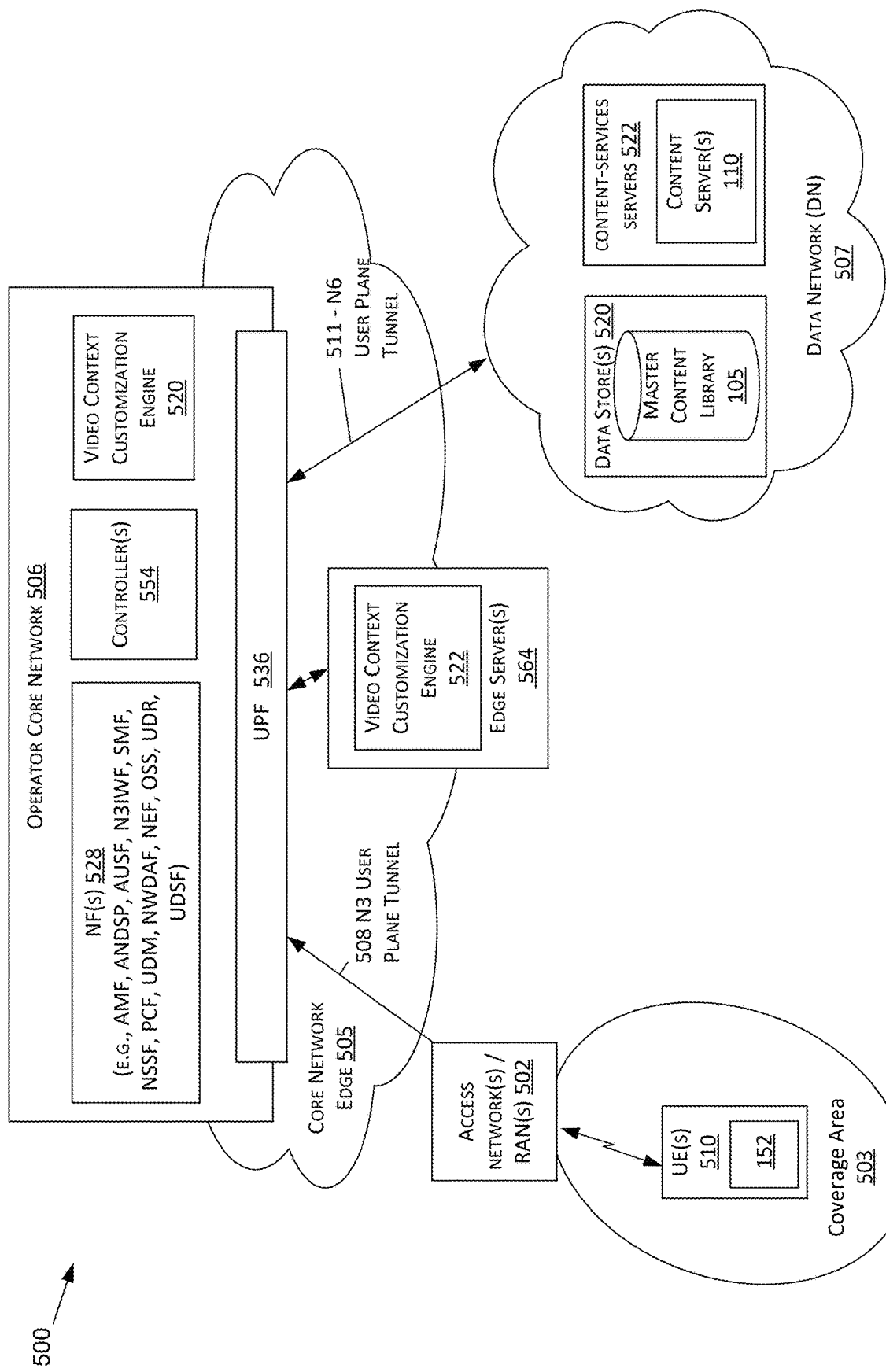
FIG. 5 is a diagram illustrating an example telecommunications network environment comprising a network function for providing contextual customization of video content as a network service, in accordance with some embodiments described herein.

Referring now to FIG. 5, FIG. 5 illustrates an example embodiment where the functions of a video context customization engine (such as video context customization engines 120 or 322) may be provided as a network service by at least one network function of a telecommunications network. For example, the at least one network function may perform one or more operations to modify the video content data 116 to produce customized video content data 132.

More specifically, FIG. 5 is a diagram illustrating an example network environment 500 embodiment for a wireless communication system that provides a video context customization engine to network subscribers as a service for customizing content from video streaming services. Network environment 500 is but one example of a suitable telecommunications network and is not intended to suggest any limitation as to the scope of use or functionality of the embodiments disclosed herein, and nor should the network environment be interpreted as having any dependency or requirement relating to any one or combination of components illustrated.

As shown in FIG. 5, network environment 500 comprises an operator core network 506 (also referred to as a "core network") that provides one or more network services to one or more UEs 510 (which may include UE 150) via at least one access network 502, such as a radio access network (RAN) 502. In some embodiments, network environment 500 comprises, at least in part, a wireless communications network, such as, but not limited to, a 5G wireless communications network. In some embodiments, the network environment 500 comprises one or more RANs 502, which may be referred to in the context of a wireless telecommunications network as a wireless base station, cell site, or cellular base station. At least one RAN 502 may represent at least one wireless base station coupled to an operator core network to establish one or more communication links between the operator core network 506 and UE 510. Each RAN 502 may provide wireless connectivity access to one or more UEs 150 operating within a coverage area 503 associated with that RAN 502. The RAN 502 may implement wireless connectivity using, for example, 3rd Generation Partnership Project (3GPP) technologies. The RAN 502 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 502 may comprise, at least in part, components of a customer premises network, such as a distributed antenna system (DAS), for example. Radio access network(s) 502 may comprise a multimodal network (for example, comprising one or more multimodal access devices) where multiple radios supporting different systems are integrated into the radio access network(s) 502. Such a multimodal access network may support a combination of 3GPP radio technologies (e.g., 4G, 5G, and/or 6G) and/or non-3GPP radio technologies (e.g., Institute of Electrical and Electronics Engineers (IEEE) 802.11 (WiFi) and/or IEEE 802.15 (Bluetooth) access points). In some embodiments, the RAN 502 may comprise a terrestrial wireless communications base station and/or may be at least in part implemented as a space-based access network, such as a base station implemented by an Earth-orbiting satellite. Individual UE 510 may communicate with the operator core network 506 via the RAN 502 over one or both of uplink (UL) radio frequency (RF) signals and downlink (DL) radio frequency (RF) signals.

As shown in FIG. 5, RAN 502 may be coupled to the operator core network 506 via a core network edge 505 that comprises edge server nodes and wired and/or wireless network connections that may further include wireless relays and/or repeaters. In some embodiments, the RAN 502 may be coupled to the operator core network 506 at least in part by a backhaul network such as the Internet or other public or private network infrastructure. Core network edge 505 may comprise one or more network nodes (e.g., servers) or other elements of the operator core network 506 that may define the boundary of the operator core network 506 and may serve as the architectural demarcation point where the operator core network 506 connects to other networks such as, but not limited to, RAN 502, the Internet, a Data Network (DN) 507, and/or other third-party networks. In some embodiments, the network edge 505 may comprise one or more network nodes that include at least one edge server 564. One or more edge server(s) 564 may provide, for example, edge-based network function services to UEs 510 that may be accessed separately from services provided by network functions of the operator core network 506. For example, edge server(s) 564 may host databases, caches, microservices, ledgers, decentralized applications (e.g., DApps), and/or may perform data traffic monitoring, inspections, and/or aggregation for other network functions of the network environment 500.

It should be understood that in some aspects, the network environment 500 may not comprise a distinct operator core network 506, but rather may implement one or more features of the operator core network 506 within other portions of the network, or may not implement them at all, depending on various carrier preferences.

As shown in FIG. 5, network environment 500 may also comprise at least one data network (DN) 507 coupled to the operator core network 506 (e.g., via the network edge 505). Data network 507 may include one or more data stores 520 and/or one or more content-services servers 522 such that UE 510 may access services and/or content provided by the data store(s) 509 and/or server(s) 522 of DN 507. For example, in some embodiments, the DN 507 may comprise a server 522 that hosts the content server 110 and/or a data store 520 that hosts master content library 105.

In some implementations, the operator core network 506 may comprise modules, also referred to as network functions (NFs), implemented by one or more processors and generally represented in FIG. 5 as NF(s) 528. Such network functions 528 may include one or more of, but not limited to, a core access and mobility management function (AMF), an access network discovery and selection policy (ANDSP), an authentication server function (AUSF), a user plane function (UPF), non-3GPP interworking function (N3IWF), a session management function (SMF), a network slice selection function (NSSF), a policy control function (PCF), a unified data management (UDM) function, a unified data repository (UDR), an unstructured data storage function (UDSF), a network data analytics function (NWDAF), a network exposure function (NEF), and an operations support system (OSS), and/or other network functions. Implementation of these NFs 528 of the operator core network 506 may be executed by one or more controllers 554 on which these network functions are orchestrated or otherwise configured to execute utilizing processors and memory of the one or more controllers 554. The NFs may be implemented as physical and/or virtual network functions, container network functions, and/or cloud-native network functions, such as is described with respect to FIG. 8.

The user plane function (UPF), illustrated in FIG. 5 at 536, represents at least one function of the operator core network 506 that may extend into the core network edge 505. In some embodiments, the RAN 502 is coupled to the UPF 536 within the core network edge 505 by a communication link that includes an N3 user plane tunnel 508. For example, the N3 user plane tunnel 508 may connect a cell site router of the RAN 502 to an N3 interface of the UPF 536. The data store(s) 509, server(s) 522, and/or other elements of DN 507 may be coupled to the UPF 536 in the core network edge 505 by an N6 user plane tunnel 511. For example, the N6 user plane tunnel 511 may connect a network interface (e.g., a switch, router, and/or gateway) of the DN 507 to an N6 interface of the UPF 536. In some embodiments, the operator core network 506 may comprise a plurality of UPFs 536, such as a UPF at the operator core network 506 and a UPF at the core network edge 505. For example, a UPF at the core network edge 505 may be used for local breakout and/or low-latency types of applications via an N9 interface between the distinct UPFs.

In some implementations, one or more aspects of a video context customization engine (such as video context customization engines 120 and 320) may be implemented using one or more network functions 528 and provided to UE 510 as a network service offered from the operator core network 506 (shown as the network core-hosted video context customization engine 520) and/or edge server 564 (shown as the network edge-hosted video context customization engine 522).

In operation, a video context customization engine (520/522) provided as a network function service of the operator core network 506 and/or edge server 564 may operate in the same manner as any of the video context customization engines described herein. A UE 510 may send a content request through the access network 502 to an API of the video context customization engine network function (520/522) to request access to a context customization network service of the video context customization engine network function. The content request may be received by a request processor that extracts a user content selection and user context selection data from the content request. The video context customization engine network function may communicate the user content selection to a content streaming engine of the content server 110 hosted on DN 507 to retrieve content data 114 from the master content library 105 hosted on DN 507. The video context customization engine network function may then generate and transport customized video content data 132 back to the access network 502 for delivery to the UE 510 for presentation. In some embodiments, the PCF of the operator core network 506 maintains subscription information indicating one or more services and/or microservices subscribed to by each UE 510, including the context customization network service provided by the video context customization engine network function.

Figure 6:
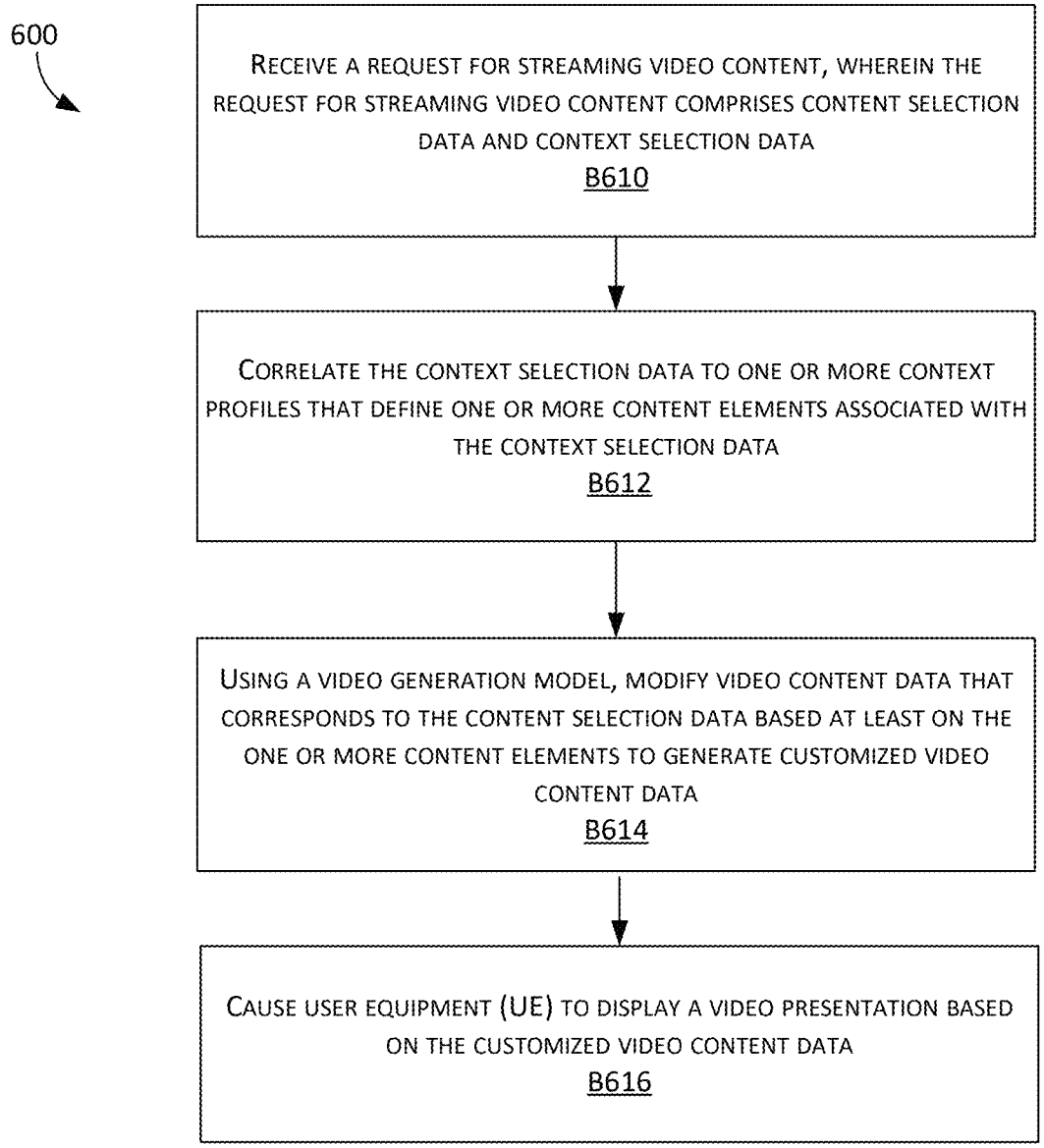
FIG. 6 is a flow chart illustrating an example method for contextual customization of video content, in accordance with some embodiments described herein.

FIG. 6 is a flow chart illustrating a method 600 for contextual customization of video content, according to some embodiments. It should be understood that the features and elements described herein with respect to the method of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa. In some embodiments, elements of method 600 are implemented utilizing one or more processing units, such as the controller of an operator core network, a network node, a networked server, an edge server, a RAN, user equipment (UE), a computing device, a cloud computing environment, and/or other processing units or computing devices as disclosed in any of the embodiments herein. In some embodiments, the method 600 may be implemented by components of a telecommunications network environment 500, such as illustrated by FIG. 5. In some embodiments, the method may be performed at least in part by a machine learning model-based customized video stream content delivery system and/or video context customization engine, such as discussed with respect to any of the figures herein.

The method 600, at B610, includes receiving a request for streaming video content, wherein the request for streaming video content comprises content selection data and context selection data. The method may further include instructing a content server to stream content data based on the content selection data, wherein the content data comprises at least the video content data. For example, as discussed with respect to FIG. 1, a content presentation client application 152 may send a content request 144 (e.g., based on user inputs) to an application programming interface (API) 140 of the video context customization engine 120. The content request 144 may be received by a request processor 134 that extracts from the content request 144, a user content selection data 128, and user context selection data 126. In some embodiments, request processor 134 may comprise a natural language processor (NLP)—such as a large language model (LLM)-based machine learning model—that demines the user content selection data 128 and/or user context selection data 126 based on a natural language input received from the user. The content request 144 may predict or infer a selection of one or more context profiles 125 from the content element library 124 based on the content request 144, and output user context selection data 126 that includes an indication of the selection. The video context customization engine 120 may communicate the user content selection data 128 to a content streaming engine 112 of the content server 110 to retrieve content data 114 from a master content library 105 (e.g., a data store comprising a library of streaming video content) based on the user content selection data 128. The content data 114 may then be transmitted (e.g., in video streaming format for streaming over a network) by the content streaming engine 112 to the video context customization engine 120.

The method 600 at B612 includes correlating the context selection data to one or more context profiles that define one or more content elements associated with the context selection data. The user context selection data 126 may indicate context selections that correlate (e.g., match) with one or more of the one or more context profiles 125. For example, a context selection that indicated 19$^{th}$ century China may correlate with a context profile comprising content elements based on various characteristics and/or features of 19$^{th}$ century China. The video context adaption engine may comprise a library of content elements that are correlated to a plurality of different context profile sets, one or more of which may be selected based on the user context selection data and applied to update the streaming video content based on the user's contextual preferences. Individual context profiles of the one or more context profiles define a set of features associated with at least one of a specific time period, set of cultural norms, set of societal norms, historical event, styles, objects, scenery, architecture, technology, location, character, actor, language, dialect, music, phrases, animals, or cultural reference associated with a particular context. In some embodiments, an individual context profile of the one or more context profiles may represent a set of characteristics that defines one or more features that form a setting for at least one of events, scenes, dialogue, action, or plot devices associated with the video content data. The method may select the one or more context profiles that define the one or more content elements from the content element library based on the context selection data. In some embodiments, the one or more context profiles may be inferred based on applying the request to a natural language processor.

The method 600 at B614 includes using a video generation model, modifying video content data that corresponds to the content selection data based at least on the one or more content elements to generate customized video content data. As explained herein, content data 114 received by the video context customization engine 120 may comprise video content data 116 and extracted context element data 118 that was derived from the video content data 116. The video content data 116 may include a combination of a video channel with video data and one or more corresponding tracks of audio in audio channels. For example, the video content data 116 may comprise a version of a motion picture or television episode, as provided by the studio or distribution company for distribution via streaming services. In some embodiments, the video generation model identifies one or more target features of the video content data to modify based on the one or more context profiles. The one or more target features may then be modified based at least in part on a matching of the one or more target features with one or more of the one or more content elements (e.g., based on a similarity). The extracted context element data 118 may comprise one or more feature characteristics of elements of the video content data 116 that are detected and/or extracted from the video content data 116, for example, by a machine learning model. In some embodiments, using the video generation model, the video content data may be modified based on extracted context element data that represents individual features of the video content data. To generate the customized video content data, the video generation model may modify one or more of the individual features of the video content data based on the one or more content elements defined by the one or more context profiles. In some embodiments, the video context customization engine may comprise a video generating mode, such as, for example a generative artificial intelligence (GAI)-based machine learning model implemented using a deep neural network (DNN), Generative Adversarial Networks (GANs), variational autoencoder (VAE), and/or other GAI machine learning model architecture. In some embodiments, the video generating model may be trained on annotated video to generate temporally coherent frames of photorealistic video.

The method 600, at B616, includes causing user equipment (UE) to display a video presentation based on the customized video content data. The customized video content data may be transmitted to the first UE in response to the request from the first UE. In some embodiments, the customized video content data may be delivered back to the UE for presentation by a content presentation client application. The UE may include computing devices such as, but not limited to, handheld personal computing devices, cellular phones, smart phones, tablets, laptops, smart televisions, content streaming devices, and similar consumer equipment, or stationary desktop computing devices, workstations, servers, and/or network infrastructure equipment. As such, the UE 150 may include both mobile UE and stationary UE. The customized video content data may be transmitted a real-time streaming output in a format for streaming video, which may be encoded in a format such as, but not limited to, High-Efficiency Video Coding (HEVC, H.265), Advanced Video Coding (H.264), AOMedia Video 1 (AV1), a Moving Picture Experts Group (MPEG) codec, or other format, protocol, and/or codec.

Figure 7:
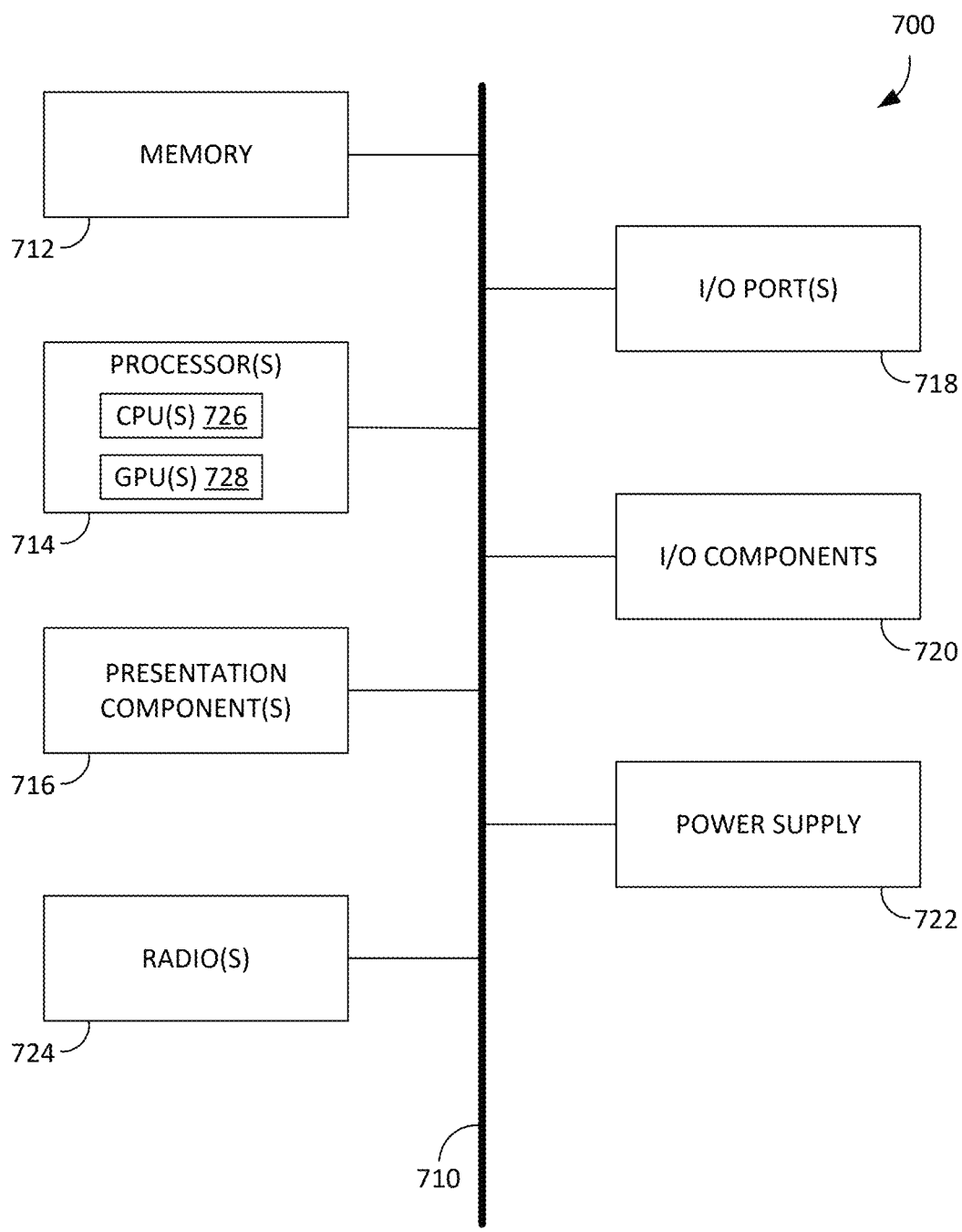
FIG. 7 is an example computing device, in accordance with some embodiments described herein.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein, and nor should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more buses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, one or more functions of a video context customization engine discussed herein may be executed at least in part by computing device 700. The processors 714 of computing device 700 may include a memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," "smart television," etc., as all are contemplated within the scope of FIG. 7 and refer to "computer" or "computing device."

Computing device 700 typically includes a variety of computer-readable media storing computer-usable instructions. For example, applications, algorithms, and/or neural networks for executing a video context customization engine may be stored in a memory comprising such computer-readable media. Computer-readable media can be any available media that can be accessed by computing device 700 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient random access memory (RAM), read only memory (ROM), electrically erasable programmable read-only memory (EEPROM), flash memory or other memory technology, compact disk (CD)-ROM, digital versatile disks (DVDs) or other optical disk storage, magnetic cassettes, magnetic tape, magnetic disk storage, or other magnetic storage devices. Computer storage media and computer-readable media do not comprise a propagated data signal or signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or non-volatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. Processors 714 may include one or more central processing units (CPUs) 726 and/or one or more graphics processing units (GPUs) 728. In some embodiments, one or more functions of a video context customization engine may be executed by the processors 714. In some embodiments, video generating model 122 and/or other machine learning models discussed herein may be executed on one or more neural networks implemented on the one or more GPUs 728. One or more presentation components 716 presents data indications to a person or other device. Exemplary one or more presentation components 716 include a display device, speaker, printing component, vibrating component, etc. I/O ports 718 allow computing device 700 to be logically coupled to other devices including I/O components 720, some of which may be built into computing device 700. Illustrative I/O components 720 include a microphone, joystick, game pad, satellite dish, scanner, printer, wireless device, etc. In some embodiments, the I/O components 720 may include a network interface card (NIC) for coupling a video context customization engine to a network, such as described herein.

Radio(s) 724 represents a radio that facilitates communication with a wireless telecommunications network. For example, radio(s) 724 may be used to establish communications with components of a network 405, a RAN 502, operator core network 506, and/or core network edge 505. Illustrative wireless telecommunications technologies include CDMA, GPRS, TDMA, GSM, and the like. Radio(s) 724 may additionally or alternatively facilitate other types of wireless communications including Wi-Fi, WiMAX, LTE, and/or other voice-over-internet protocol (VOIP) communications. In some embodiments, radio(s) 724 may support multimodal connections that include a combination of 3GPP radio technologies (e.g., 4G, 5G, and/or 6G) and/or non-3GPP radio technologies. As can be appreciated, in various embodiments, radio(s) 724 can be configured to support multiple technologies and/or multiple radios can be utilized to support multiple technologies. In some embodiments, the radio(s) 724 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 8:
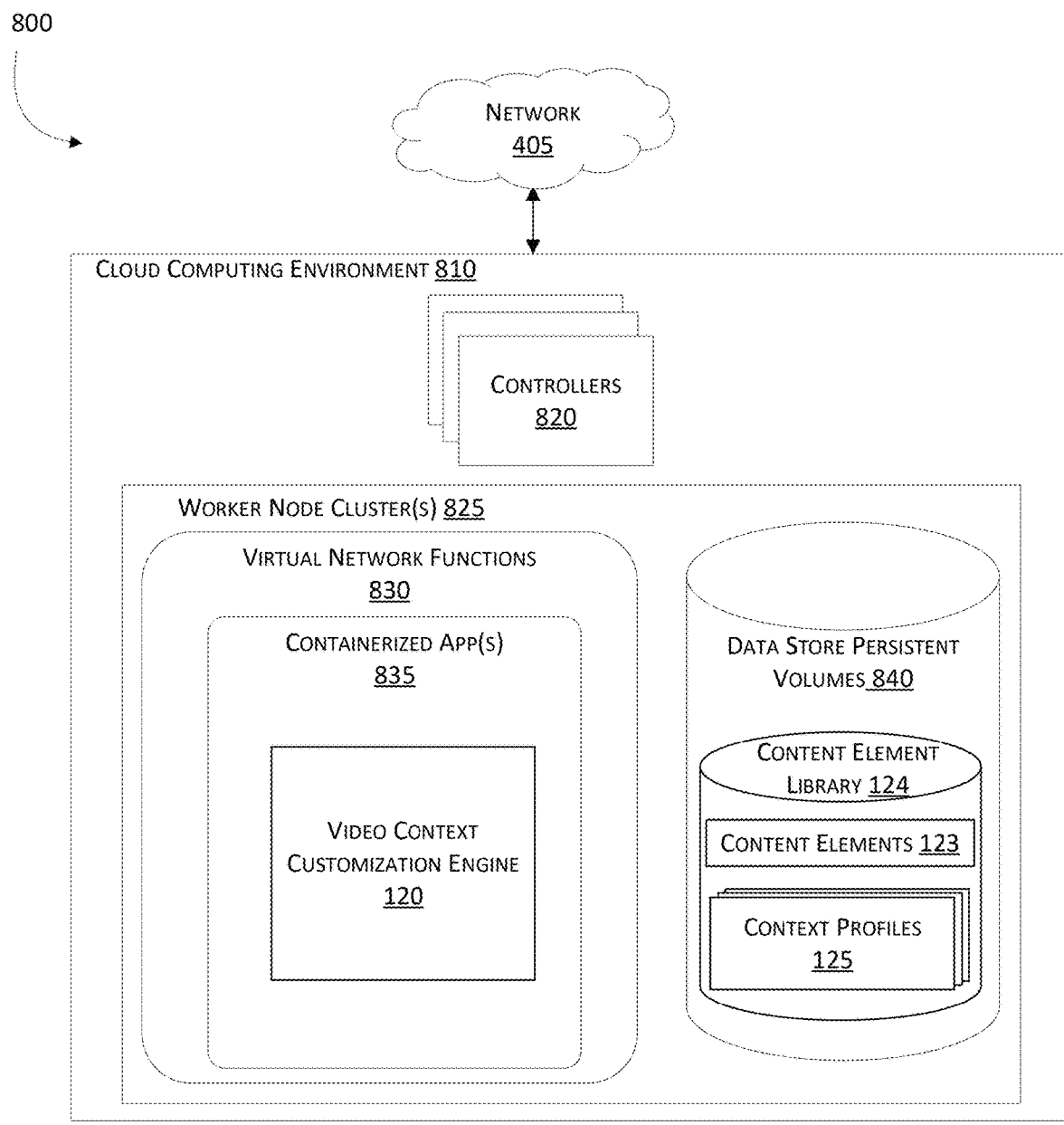
FIG. 8 is an example cloud computing platform, in accordance with some embodiments described herein.

Referring to FIG. 8, a diagram is depicted generally at 800 of an exemplary cloud computing environment 810 for implementing one or more aspects of a video context customization engine, as implemented by the systems and methods described herein. Cloud computing environment 810 is but one example of a suitable cloud computing environment and is not intended to suggest any limitation as to the scope of use or functionality of the embodiments presented herein, and nor should cloud computing environment 810 be interpreted as having any dependency or requirement relating to any one or combination of components illustrated. In some embodiments, the cloud computing environment 810 is coupled to network 405 and/or may be executed within operator core network 506, the core network edge 505, edge server 564, or otherwise coupled to the core network edge 505 or operator core network 506.

Cloud computing environment 810 includes one or more controllers 820 comprising one or more processors and memory. The controllers 820 may comprise servers of a data center. In some embodiments, the controllers 820 are programmed to execute code to implement at least one or more aspects of a video context customization engine. For example, in one embodiment a network function for a video context customization engine 120 as discussed herein may be implemented as one or more virtual network functions (VNFs) 830 (which may include one or more container network functions (CNFs) running on a worker node cluster 825 established by the controllers 820.

The cluster of worker nodes 825 may include one or more orchestrated Kubernetes (K8s) pods that realize one or more containerized applications 835. In other embodiments, another orchestration system may be used. For example, the worker nodes 825 may use lightweight Kubernetes (K3s) pods, Docker Swarm instances, and/or other orchestration tools. In some embodiments, one or more elements of the machine learning-based customized video stream content delivery system 100, including one or more video context customization engines 120 of 320 may be implemented by, or coupled to, the controllers 820 of the cloud computing environment 810 by network 405, operator core network 506, and/or core network edge 505. In some embodiments, one or more elements of a content element library 124 may be implemented at least in part using one or more data store persistent volumes 840 in the cloud computing environment 810.

In various alternative embodiments, system and/or device elements, method steps, or example implementations described throughout this disclosure (such as the UE, network nodes, servers, access networks, core network edge, operator core network, network functions, video context customization engine, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of a device having a physical, tangible form. Program instructions include, but are not limited to, computer-executable instructions executed by computer system processors and hardware description languages such as Verilog or Very High-Speed Integrated Circuit (VHSIC) Hardware Description Language (VHDL).

As used herein, the terms "network function," "engine," "processor," "controller," "unit," "model," "server," "node," and "module" are used to describe computer processing components and/or one or more computer-executable services being executed on one or more computer processing components. In the context of this disclosure, such terms used in this manner would be understood by one skilled in the art to refer to specific network elements and are not used as nonce word or intended to invoke 35 U.S.C. 112 (f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for contextual customization of video content, the system comprising:
one or more processors; and
one or more computer-readable media storing computer-usable instructions that, when executed by the one or more processors, cause the one or more processors to:
receive a request for streaming video content, wherein the request for streaming video content comprises content selection data and context selection data;
correlate the context selection data to one or more context profiles that define one or more content elements associated with the context selection data;
using a video generation model, modify video content data that corresponds to the content selection data based at least on the one or more content elements to generate customized video content data; and
cause user equipment (UE) to display a video presentation based on the customized video content data.

2. The system of claim 1, the one or more processors further to instruct a content server to stream content data based on the content selection data, wherein the content data comprises at least the video content data.

3. The system of claim 1, wherein the one or more processors modify the video content data, using the video generation model, further based on extracted context element data that represents individual features of the video content data; and wherein to generate the customized video content data, the video generation model modifies one or more of the individual features of the video content data based on the one or more content elements defined by the one or more context profiles.

4. The system of claim 1, wherein individual context profiles of the one or more context profiles define a set of features associated with at least one of a specific time period, set of cultural norms, set of societal norms, historical event, styles, objects, scenery, architecture, technology, location, character, actor, language, dialect, music, phrases, animals, or cultural reference associated with a particular context.

5. The system of claim 1, further comprising a content element library, wherein the one or more processors are further to select the one or more context profiles that define the one or more content elements from the content element library based on the context selection data.

6. The system of claim 1, wherein the video generation model identifies one or more target features of the video content data to modify based on the one or more context profiles; and
wherein the one or more target features are modified based at least in part on a matching of the one or more target features with one or more of the one or more content elements, based on a similarity.

7. The system of claim 1, wherein an individual context profile of the one or more context profiles represents a set of characteristics that defines one or more features that form a setting for at least one of events, scenes, dialogue, action, or plot devices associated with the video content data.

8. The system of claim 1, wherein the video generation model comprises at least one of: a machine learning model, a generative artificial intelligence (GAI) model, a deep neural network (DNN), a generative adversarial network (GAN), or a variational autoencoder (VAE).

9. The system of claim 1, wherein the request for streaming video content is received via a network connection from the UE, the UE comprising a client application for presenting the customized video content data.

10. The system of claim 1, wherein the one or more processors are configured to infer the one or more context profiles based on applying the request to a natural language processor.

11. A telecommunications network, the network comprising:
an operator core network;
at least one edge server coupled to a core network edge of the operator core network;
at least one radio access network coupled to the operator core network, wherein the at least one radio access network establishes one or more communication links between the operator core network and one or more user equipment (UE); and
at least one network function executed on one or more processors configured to perform one or more operations to:
receive a request from a first UE of the one or more UE for streaming video content, wherein the request for streaming video content comprises content selection data and context selection data;
instruct a content server to transmit content data to the at least one network function based on the content selection data, wherein the content data comprises at least video content data;
correlate the context selection data to one or more context profiles from a content element library, wherein the one or more context profiles define one or more content elements associated with the context selection data;
using a video generation model, modify the video content data based at least on the one or more content elements to generate customized video content data; and
transmit the customized video content data to the first UE in response to the request from the first UE.

12. The network of claim 11, wherein the at least one network function comprises a video context customization engine executed by the one or more processors on the at least one edge server.

13. The network of claim 11, wherein the one or more processors comprise one or more controllers of a cloud computing environment, wherein the at least one network function comprises a video context customization engine executing on a worker node cluster established by the one or more controllers.

14. The network of claim 11, wherein the at least one network function modifies the video content data, using the video generation model, further based on extracted context element data that represents individual features of the video content data; and
wherein to generate the customized video content data, the video generation model modifies one or more of the individual features of the video content data based on the one or more content elements defined by the one or more context profiles.

15. The network of claim 11, wherein the video generation model identifies one or more target features of the video content data to modify based on the one or more context profiles; and
where the one or more target features are modified based at least in part on a matching of the one or more target features with one or more of the one or more content elements, based on a similarity.

16. The network of claim 11, wherein the video generation model identifies one or more target features of the video content data to modify based on the one or more context profiles; and
where the one or more target features are modified based at least in part on a matching of the one or more target features with one or more of the one or more content elements, based on a similarity.

17. The network of claim 11, wherein an individual context profile of the one or more context profiles represents a set of characteristics that defines one or more features that form a setting for at least one of events, scenes, dialogue, action, or plot devices associated with the video content data.

18. A method comprising:
receiving a request for streaming video content, wherein the request for streaming video content comprises content selection data and context selection data;
requesting a content server to transmit content data based on the content selection data, wherein the content data comprises at least video content data;
correlating the context selection data to one or more context profiles that define one or more content elements associated with the context selection data;
using a video generation model, modifying the video content data based at least on the one or more content elements to generate customized video content data; and
causing user equipment (UE) to display a video presentation based on the customized video content data.

19. The method of claim 18, wherein an individual context profile of the one or more context profiles represents a set of characteristics that defines one or more features that form a setting for at least one of events, scenes, dialogue, action, or plot devices associated with the video content data.

20. The method of claim 18, wherein the video generation model identifies one or more target features of the video content data to modify based on the one or more context profiles; and wherein the one or more target features are modified based at least in part on a matching of the one or more target features with one or more of the one or more content elements, based on a similarity.

* * * * *